April 2, 1968  G. R. FEE  3,375,801
AMPHIBIOUS DEVICE
Filed Oct. 31, 1966  3 Sheets-Sheet 1
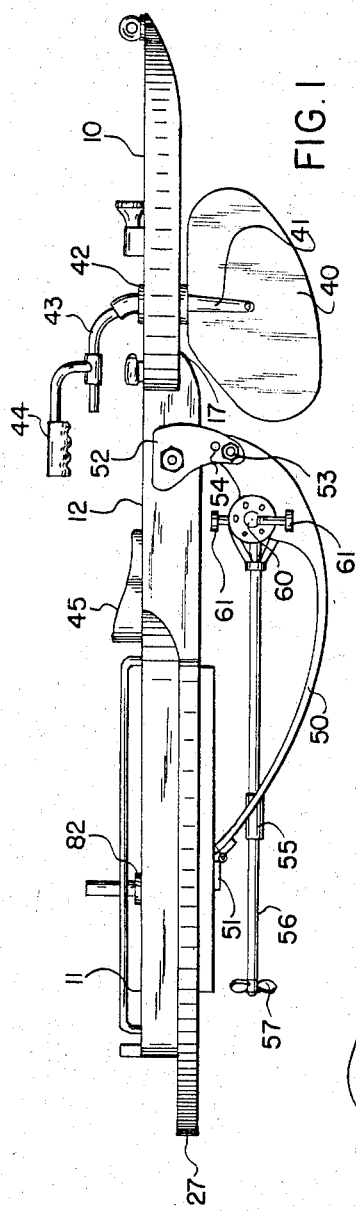
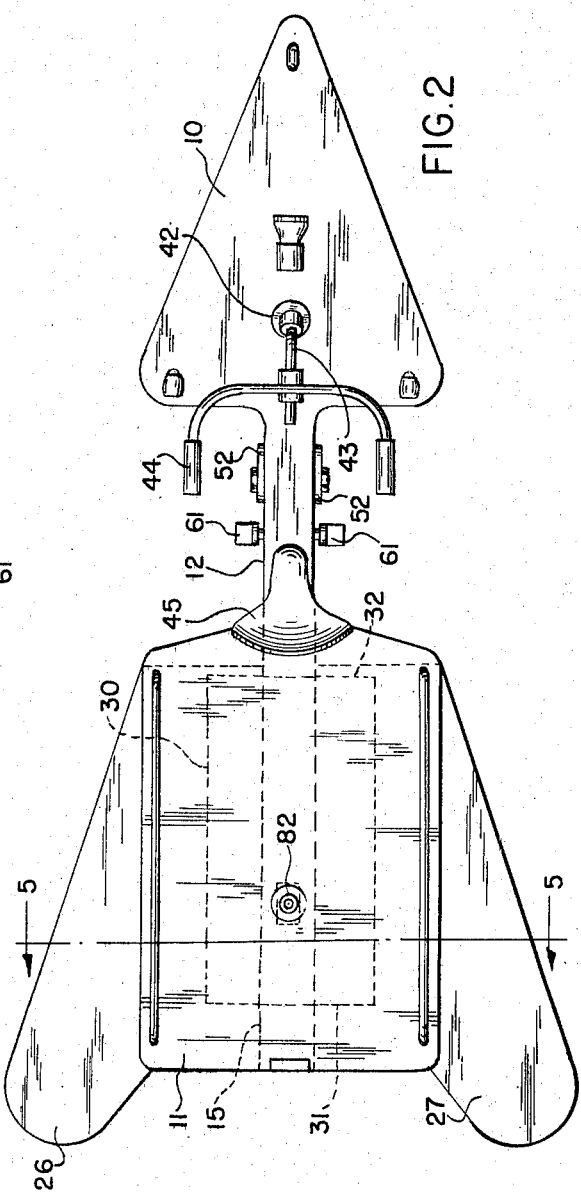
INVENTOR
GLENN R. FEE
BY
Teare, Teare & Sammon
ATTORNEYS

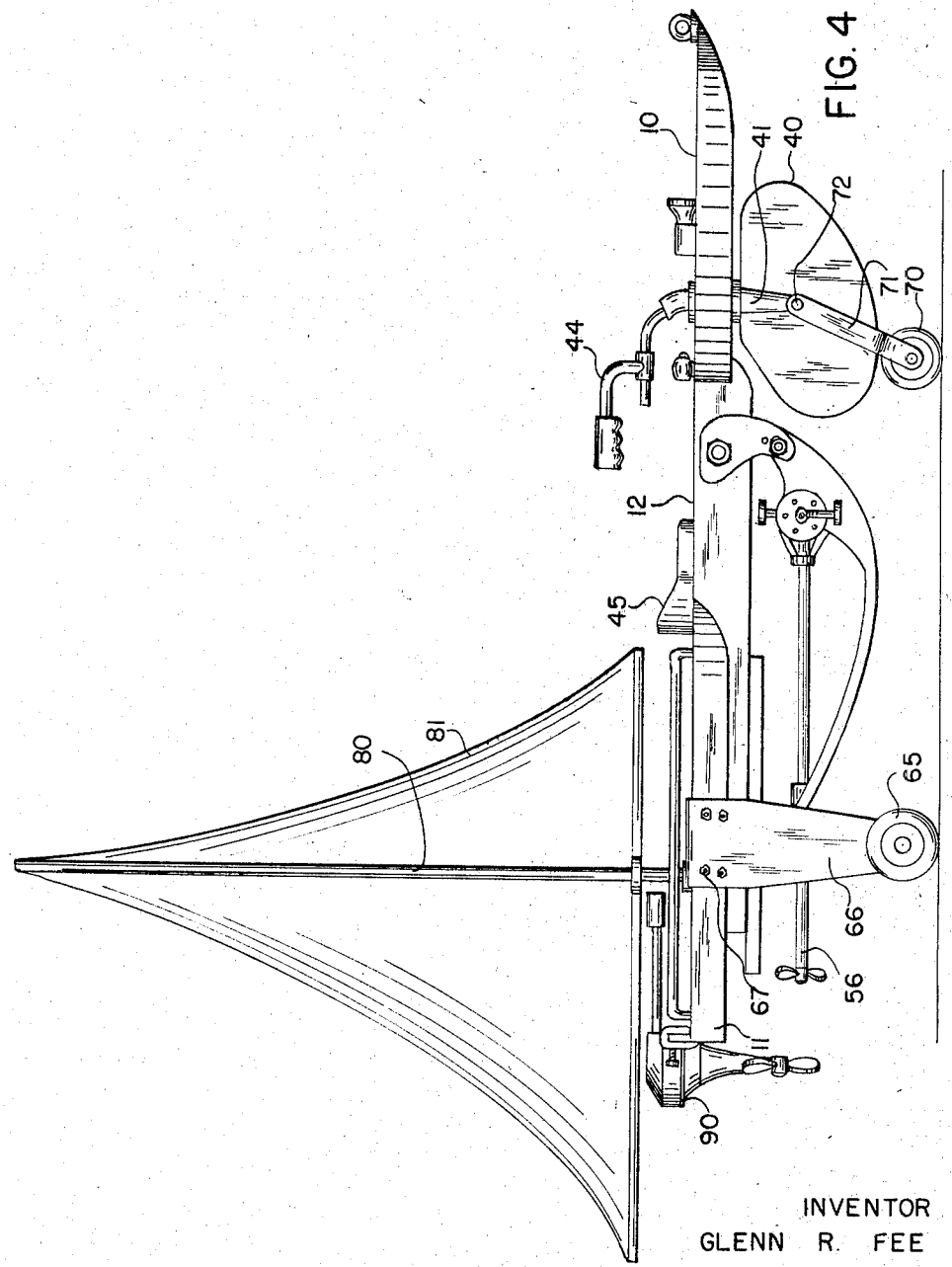

April 2, 1968  G. R. FEE  3,375,801
AMPHIBIOUS DEVICE
Filed Oct. 31, 1966  3 Sheets-Sheet 3
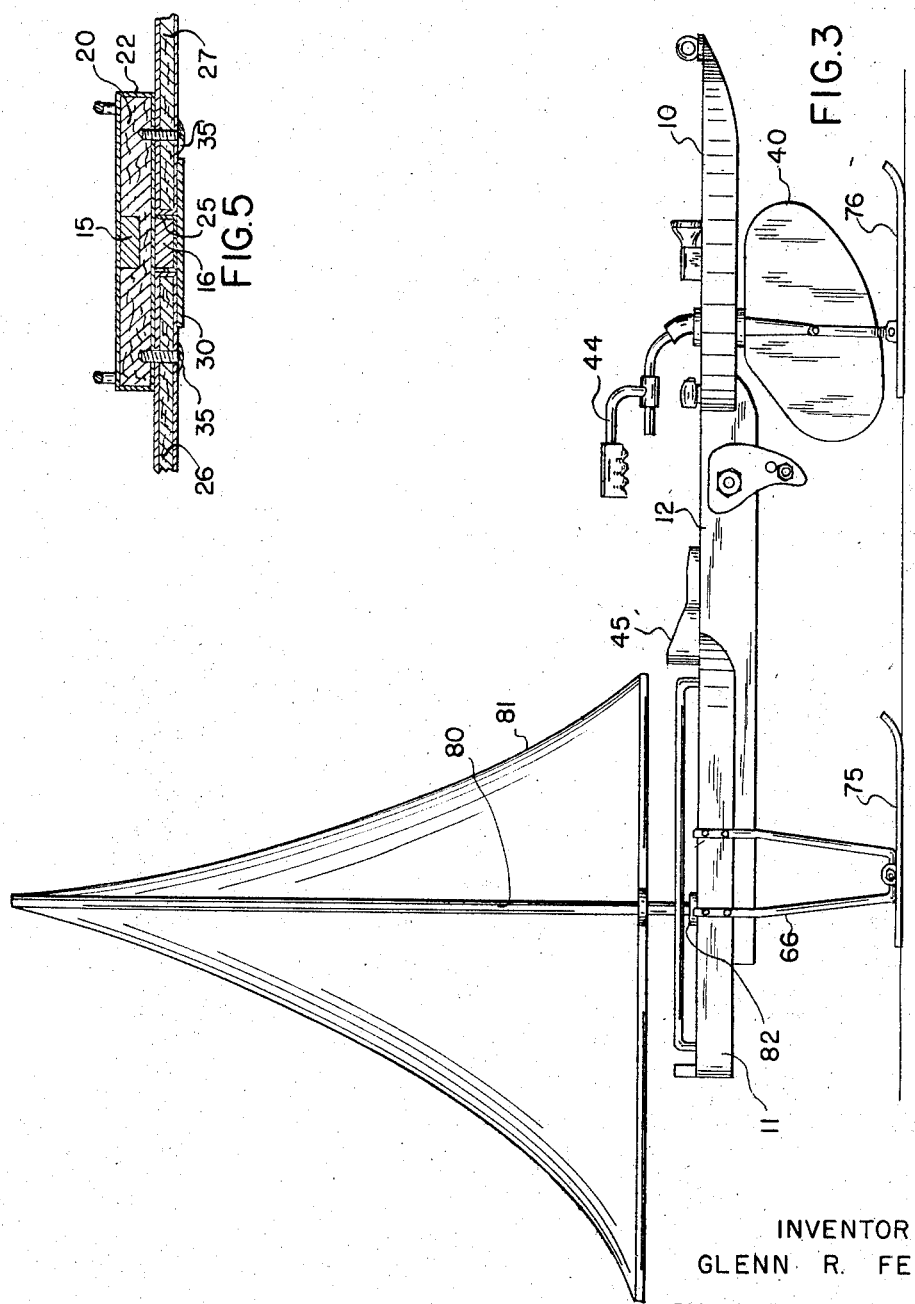
INVENTOR
GLENN R. FEE
BY
Teare, Teare & Sammon
ATTORNEYS United States Patent Office 3,375,801
Patented Apr. 2, 1968

3,375,801
AMPHIBIOUS DEVICE
Glenn R. Fee, 4758 Timberview Drive, Valley Hills Park, Ravenna, Ohio 44266
Filed Oct. 31, 1966, Ser. No. 590,754
10 Claims. (Cl. 115—2)

This invention relates to a recreational vehicle and particularly to an amphibious vehicle which is intended for operation by a person who is seated on the vehicle.

An object of the invention is to construct a vehicle which has adequate buoyancy for supporting a person in seated position thereon and which can be safely propelled through water without endangering his safety.

An additional object is to construct a vehicle which is sufficiently light in weight that it can be moved readily along the ground and which is capable of being easily moved into and out of water.

A further object is to provide a vehicle which may be propelled through water either by manual operation or by an outboard motor and which may also be equipped with skis, skates or a sail.

Briefly, the foregoing objects are accomplished by constructing a hull which is generally in the shape of an arrow, as viewed from the top, wherein the bow portion, or forward section represents the head of an arrow, the stern portion or rearward section represents the tail of an arrow and the connecting portion represents the shaft of an arrow. The forward, rearward and connecting sections comprise a sheet of styrofoam which is encased in a rigid housing such as plywood or fiber glass. A central beam extends from the bow to the stern and carries a seat in such position that the legs of an operator can straddle the beam and operate foot pedals for turning a propeller which is supported beneath the hull. A vane which functions as a combined rudder and keel is mounted beneath the forward or bow section and is adapted to be turned by means of a handle which is disposed in front of the seat in the bow section. Provision is made for increasing the buoyancy by the use of auxiliary floats which are detachably connected to the rearward section, and provision is also made for propelling the vehicle by means of an outboard motor or by sail if desired. Additionally, the vehicle may be provided with ground engaging wheels, skis or skates thereby extending the use of the vehicle to land and ice, or snow.

Referring to the drawings,

FIG. 1 is a side view of a vehicle embodying the present invention when used solely for manual propulsion on water;

FIG. 2 is a top plan view of the vehicle shown in FIG. 1;

FIG. 3 is a side view of a vehicle which is equipped with skis and sail, but with the foot propulsion means removed from the hull;

FIG. 4 is a side view of a vehicle equipped with ground engaging wheels, and with manual and outboard propulsion means, as well as a sail;

FIG. 5 is a transverse section taken on the plane indicated by the line 5—5 in FIG. 2.

The vehicle of the present invention is intended for use of one person and in general has a hull which, when viewed from the top, has generally an arrow shape with a forward or bow section 10, a stern or tail section 11 and a connecting portion 12. An upper beam 15 (FIG. 5), preferably of wood, extends from the forward end of the section 10 to the rearward end of the section 11, and a lower beam 16, also preferably of wood, extends from the rearward end of the section 11 to a point 17 adjacent the rearward end of the section 10.

Buoyancy is obtained by utilizing a sheet of styrofoam 20 which completely fills the interior of the sections 10, 11 and the connecting portion 12 and which is encased in a housing 22 such as plywood or fiber glass to protect the styrofoam. The lower beam 16 is attached as shown in FIG. 5 by any suitable means to the lowermost surface of the housing and is also protected by plywood or fiber glass housing as shown at 25 in FIG. 5.

Provision is made for additional buoyancy by the use of detachable floats 26, 27 each of which comprises a sheet of styrofoam encased in a rigid housing similar to the construction utilized for the sections 10 and 11. As shown in FIG. 5, the floats may be inserted laterally beneath the section 11 into pockets which are formed respectively on opposite sides of the beam 16 by means of a plate 30 which is attached to the lower beam and extends for nearly the length thereof, as shown by the dotted lines 31 and 32 in FIG. 2. The floats may be secured in place by any suitable means such as the fastening members 35 (FIG. 5).

The vehicle is steered and stabilized in water by a vane 40, which extends vertically downwardly from the section 10 and is rigidly attached to a fork 41, the upper end of which extends through a sleeve 42, which has a water-tight connection with the top and bottom surfaces of the section 10. The upper end 43 terminates in handle bars 44 by means of which the vane can be turned by an operator. A seat 45 is provided for an operator adjacent the forward end of the section 11.

For manual propulsion in water a beam 50 may be hingedly connected at 51 adjacent the bottom of section 11 and may be adjustably connected at its forward end to a bracket 52 which depends from the connecting portion 12. The forward connection is shown as a bolt 53 which may be inserted selectively in any one of spaced holes 54 in the bracket 52. The plate or beam 50 as shown in FIG. 1 is curved and provides a bearing 55 for a shaft 56 to which a propeller 57 is attached.

The forward end of the plate or beam 50 also provides a bearing for a pedal operated shaft 60 which is suitably connected, as by bevel gearing, to the shaft 56. Pedals, one at each end of the shaft, are positioned on opposite sides of the connecting portion 12, as shown in FIGS. 1 and 2.

For movement on land, and for facilitating movement between land and water, the vehicle is provided with two rearward ground engaging wheels 65 which are journaled in brackets 66. The brackets may be attached, as by fasteners 67, to the sides of the section 11. A forward ground engaging wheel 70 may be journaled in a fork 71 which in turn is connected at 72 to the fork 41.

In FIG. 3 the wheels are replaced by skis 75 and 76 or skates (not shown) which are attached in any suitable manner. Additionally, in FIGS. 3 and 4 a mast 80 for a sail 81 may be supported in a socket 82 which is mounted in the section 11. Additionally, in FIG. 4 there is shown an outboard motor, indicated at 90, which may be detachably connected to the rearward end of the section 11.

Satisfactory buoyancy for a single person has been obtained by utilizing styrofoam in slab form with a thickness of about 4 inches and with a combined area in plan view of about 15 square feet. The buoyancy of the auxiliary floats may be varied as desired. As shown the thickness of the styrofoam for the auxiliary floats is about 2 inches and the area in plan view is about 8 square feet.

The preferred embodiments of the invention are illustrated in the drawings, but it is to be understood that changes and variations may be made by those skilled in the art without departing from the spirit and scope of the appended claims.

I claim:

1. An amphibious device embodying a hull having substantially parallel top and bottom surfaces, said hull comprising a forward or bow section having a generally triangular shape and a rearward or tail section having a generally rectangular shape, said sections being joined by a restricted connecting portion, a vertically extending vane disposed beneath the forward section, means for swively mounting the vane upon the forward section, said means terminating in a handle above the forward section, a seat mounted on the hull adjacent the rearward section and propulsion means carried by the hull rearwardly of the vane.

2. A device according to claim 1 wherein the hull comprises a sheet of styrofoam and a rigid housing therefor.

3. A device according to claim 1 wherein a pair of flat floats each comprising a sheet of styrofoam and a rigid housing therefor are detachably connected to the sides of the rear section for increasing the buoyancy of the hull.

4. A device according to claim 1 wherein a shaft having a propeller thereon is journaled beneath the hull and wherein foot propelled members are mounted for rotation on a horizontal axis beneath the hull and between the seat and handle, and wherein gearing operatively connects the propeller shaft to the members.

5. A device according to claim 4 wherein the propeller shaft and foot propelled members are mounted upon a beam which extends in a direction generally longitudinally of the hull and which is hingedly connected at one end to the hull, and is selectively connected at the other end to the hull.

6. A device according to claim 5 wherein a bracket extends downwardly from the intermediate section of the hull and has spaced openings therein, there being fastening means for selectively securing the forward end of the beam to the bracket.

7. A device according to claim 1 wherein a pair of ground engaging wheels support the hull adjacent the rear section and wherein a single ground engaging wheel supports the hull adjacent the front section.

8. A device according to claim 1 wherein brackets depend from the hull and are provided with skates or skis, whereby the device may be propelled over ice or snow.

9. A vehicle according to claim 1 wherein the propulsion means comprises an outboard motor attached to the rearward section.

10. A vehicle according to claim 1 wherein a socket is provided in the rear section and supports a mast to which a sail may be attached.

References Cited

UNITED STATES PATENTS 1,005,478    10/1911    Sandberg _____ 115—26.3

ANDREW H. FARRELL, *Primary Examiner.*